United States Patent [19]
Budinger et al.

[11] Patent Number: 5,240,491
[45] Date of Patent: Aug. 31, 1993

[54] ALLOY POWDER MIXTURE FOR BRAZING OF SUPERALLOY ARTICLES

[75] Inventors: David E. Budinger, Milford; Stephen J. Ferrigno; Wendy H. Murphy, both of Cincinnati, all of Ohio

[73] Assignee: General Electric Company, Cincinnati, Ohio

[21] Appl. No.: 726,495

[22] Filed: Jul. 8, 1991

[51] Int. Cl.$^5$ .................... C22C 19/05; C22C 19/07; B23K 31/02
[52] U.S. Cl. .................... 75/255; 428/668; 428/678; 428/680; 228/119; 228/262.31
[58] Field of Search .................. 75/255; 228/119, 238; 428/668, 678, 680, 570

[56] References Cited

U.S. PATENT DOCUMENTS

| | | | |
|---|---|---|---|
| 3,482,967 | 12/1969 | Redden | 420/454 |
| 3,542,543 | 11/1970 | Yount et al. | 420/454 |
| 3,678,570 | 7/1972 | Paulonis et al. | 29/498 |
| 4,008,844 | 2/1977 | Duvall et al. | 228/119 |
| 4,073,639 | 2/1978 | Duvall et al. | 75/255 |
| 4,285,459 | 8/1981 | Baladjanian et al. | 228/119 |
| 4,381,944 | 5/1983 | Smith, Jr. et al. | 75/255 |
| 4,389,251 | 6/1983 | Simm et al. | 75/255 |
| 4,478,638 | 10/1984 | Smith, Jr. et al. | 75/255 |
| 4,705,203 | 11/1987 | McComas et al. | 228/119 |
| 4,830,934 | 5/1989 | Ferrigno et al. | 428/678 |
| 4,910,098 | 3/1990 | Lee et al. | 75/255 |

Primary Examiner—R. Dean
Assistant Examiner—Margery S. Phipps
Attorney, Agent, or Firm—Carmen Santa Maria; Jerome C. Squillaro

[57] ABSTRACT

A series of braze materials for brazing superalloy substrates at effective brazing temperatures above about 2300° F. is described. The braze materials are formulated as mixtures of cobalt- and nickel-base alloy powders. Each such braze material contains at least two components, one of which is predominantly liquid at the effective brazing temperature, and one of which remains substantially solid at that temperature. The brazing materials solidify by an isothermal solidification process. Unless otherwise limited by the temperature capability of the superalloy substrate being joined, these brazing alloys provide joints that have useful strength at temperatures significantly higher than joints made with prior art brazing alloys.

16 Claims, 2 Drawing Sheets

100 X

100 X

ALLOY POWDER MIXTURE FOR BRAZING OF SUPERALLOY ARTICLES

BACKGROUND OF THE INVENTION

1. Field of the Invention

This invention relates to the joining of superalloy articles by brazing, and, more particularly, to brazing alloys formulated as alloy powder mixtures.

2. Description of Prior Art

A variety of high temperature superalloys of the nickel-base and cobalt-base types are used in a variety of components in the high temperature operating section of gas turbine engines. Because gas turbine engines can be made to operate more efficiently by raising internal operating temperatures, a number of improved superalloys for use at progressively higher temperatures have been developed. Not only have new alloys been developed, but improved manufacturing techniques, such as directional solidification, which produce articles where the deleterious effect of grain boundaries on high temperature strength and creep resistance has been significantly reduced, have also been developed. However, where the design of parts or components for such engines requires that the superalloys be brazed, the temperature capability of the brazing alloy effectively limits the temperature capability of the brazed assembly. Thus, there has been a need for brazing alloys which retain their useful strength to higher temperatures, to better utilize the temperature capability of advanced superalloys, particularly those superalloys produced as directionally solidified or single grain articles.

Historically, brazing alloys formulated for joining superalloy articles have been categorized as precious metal alloys or nickel-base and cobalt-base alloys. Precious metal alloys are generally not usable at temperatures above about 1500° F., and also suffer from the disadvantage of high material cost. Nickel-base brazing alloys typically contain nickel, a melting point depressant such as silicon or boron, and, in some alloys, some of the same alloying elements employed in superalloy articles, such as cobalt, chromium, aluminum, titanium, etc. The composition of one such brazing alloy, sometimes known as B-28, is the same as that of an alloy frequently used for conventionally cast turbine airfoils, called Rene'80, to which about 2 percent boron has been added. The brazing temperature for B-28 alloy is about 2215° F.; its maximum effective use temperature is about 2000° F.

Redden (U.S. Pat. No. 3,482,967) and Yount et al. (U.S. Pat. No. 3,542,543) have described nickel-base brazing alloys which include silicon as the only melting point depressant. These alloys were specifically formulated to avoid deleterious interaction between the molten brazing alloy and the substrate, particularly a substrate of the dispersion strengthened nickel-chromium type. The normal brazing temperature for the alloy described by Redden is approximately 2375° F.; its maximum use temperature is about 2200° F.

Several inventors, including Paulonis et al. (U.S. Pat. No. 3,678,570), Duvall et al. (U.S. Pat. Nos. 4,008,844 and 4,073,639), Baladjanian et al. (U.S. Pat. No. 4,285,459), Smith, Jr. et al. (U.S. Pat. No. 4,381,944) and Ferrigno et al. (U.S. Pat. No. 4,830,934), have described brazing materials which are mixtures of at least two different powder constituents having different melting temperatures. These mixtures achieve joining because the low-melting constituent liquefies at the brazing temperature, and wets both the substrate materials and particles of the high-melting constituent. Melting point depressants in the low-melting constituent, especially boron, can diffuse into both the substrate and the high-melting particles, thereby achieving isothermal solidification. Such materials are useful both for joining, and for filling voids like cracks or notches in superalloy articles. The size of the voids that can be filled with such materials is much greater than those which can be filled with conventional brazing alloys. However, such materials have been heretofore formulated to be brazed at temperatures lower than about 2215° F. The maximum effective use temperature for articles brazed with such materials is about 2100° F., or below. While these brazing materials are useful for joining conventional superalloys such as Rene'80, using them to braze advanced superalloys effectively precludes utilizing the full temperature capabilities of the advanced alloys.

The brazing temperatures used in the prior art have been at or below about 2200° F. for two principal reasons. First, conventional superalloys such as Rene'80 are subject to incipient melting at higher temperatures. Second, it has been heretofore considered necessary that single grain superalloy articles be brazed at or below a temperature at which a sufficient amount of the gamma-prime phase remains undissolved in the gamma matrix so that recrystallization, which causes formation of stray grains in single grain articles, can be prevented. Precipitation of particles of the gamma-prime phase is the principal strengthening mechanism in superalloys of the type discussed herein.

Thus, there is a need for a braze material for brazing superalloy substrates which permits the brazed substrates to be used at design temperatures of the superalloy.

SUMMARY OF THE INVENTION

The present invention describes a series of alloys, which are formulated as mixtures of cobalt- and nickel-base alloy powders, for brazing superalloy articles at brazing temperatures in excess of 2300° F. Each material contains at least two constituent alloy powders, one of which is substantially liquid at the preferred brazing temperature for the material, the low-melting alloy, and another of which remains substantially solid at that brazing temperature, the high-melting alloy. During the brazing process, sufficient interdiffusion occurs among the atomic species of those two alloys and the surface regions of the articles being joined so that the brazing alloy solidifies by an isothermal process. In particular, melting point depressants such as boron and/or silicon, which are incorporated in the low-melting alloy, diffuse out of the low-melting alloy into the powder particles of the high-melting alloy and into the substrate article, thereby raising the melting temperature of the low-melting alloy. Because the alloy mixtures of the present invention contain relatively low amounts of melting point depressants, the preferred brazing temperatures are significantly higher than for alloy powder mixtures in the prior art. Thus, the resulting brazed joint can be effectively used at temperatures that are much higher than for joints made with prior art multi-component brazing alloys, except when the use temperature is governed by other considerations, such as the capabilities of the articles being joined. Also, the effective use temperature for brazed joints made with single-component brazing alloys is generally more than 175° F. below the effective brazing temperature. Thus, the brazing alloys of the present invention permit use of brazed articles at temperatures significantly higher than had heretofore been possible, also providing additional design and manufacturing flexibility in the use of articles made from advanced superalloys, including directionally solidified and single grain articles. The brazing alloys of the present invention have also been formulated to have good environmental resistance and to avoid deleterious effects on metallic or ceramic coatings which might be applied over a brazed joint.

Several conventional turbine airfoil alloys and strengthened overlay coating alloys have been found to be suitable in the high-melt component of the braze material. The low-melt component may be either or both of two types of alloy; one contains sufficient boron or silicon to depress its melting point below the brazing temperature of the mixture, while the other has a eutectic or near-eutectic composition which also has a melting point below the brazing temperature of the mixture. Each constituent of the mixture is manufactured as a finely divided powder, and the various constituent powders are thoroughly mixed. All of the constituent powders may be mixed together at the same time, and not necessarily premixed into high-melt or low-melt components. The mixture may be introduced to the articles being joined in any convenient manner, such as in slurry or paste form, supported in a conventional organic binder, or as a solid preform. The latter form is especially useful for filling slots or holes in a superalloy article. These commonly used techniques for introducing the braze material to the articles being joined are described for illustrative purposes only; they are not considered to be part of or essential to the present invention.

The present invention also describes a brazing process where the effective brazing temperature is substantially above the recrystallization temperature of single grain superalloy articles.

An advantage of the braze material of the present invention is that superalloy articles joined with it may be used for brazing at temperatures above about 2300° F. without detrimental effect to the articles. It is particularly useful for joining single grain articles.

A further of the braze material of the present invention is that it has usable strength and can therefore be used in service at temperatures approaching the brazing temperature.

Still another advantage of the braze material of the present invention is that it has good environmental resistance, and comprises a suitable substrate for metallic or ceramic coatings.

These and other advantages will be more fully understood from the following detailed description and examples, all of which are intended to be representative of, rather than in any way limiting on, the scope of the present invention.

DETAILED DESCRIPTION OF THE INVENTION

Figure 1:
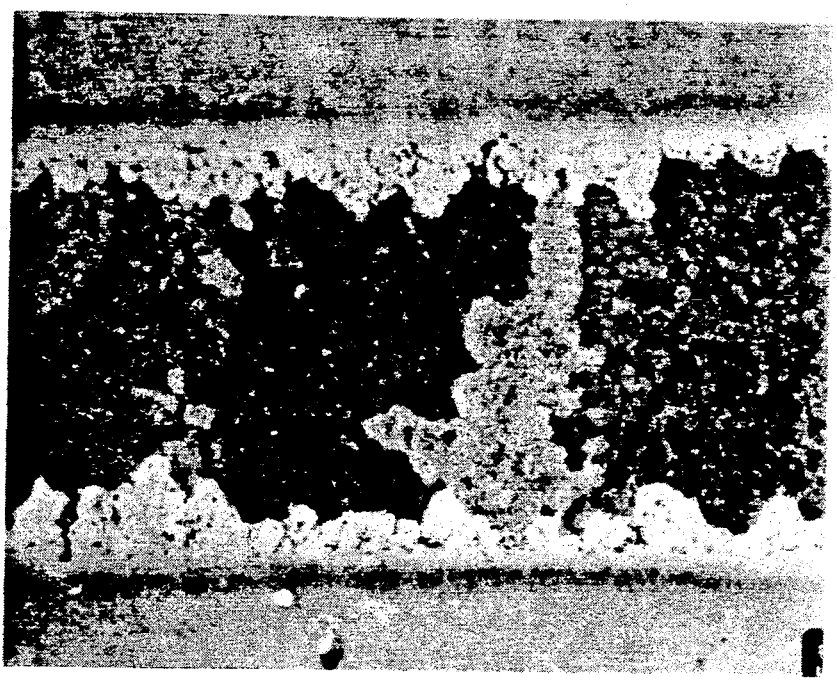
FIG. 1 is a photomicrograph of a brazed joint and adjacent substrate, where the joint was made with Alloy 9 under the conditions described in Example 3. Magnification 100×.

With the development of advanced superalloys, including those superalloys specifically developed to be used in the form of directionally solidified or single grain articles, it has become apparent that there is a need for brazing alloys having higher temperature capabilities than prior art brazing alloys. Likewise, it has become apparent that there is a need for brazing alloys which can be used to fill voids, such as holes, slots or notches, in such superalloys, particularly in the context of closing small chaplet holes or core prints in complex superalloy castings. The present invention encompasses a series of alloy powder mixtures which are particularly useful in meeting these needs. These alloy powder mixtures permit the use of brazed or filled superalloy articles at temperatures higher than would be possible with prior art brazing alloys. Prior art multi-component brazing alloys are typically formulated for a brazing temperature of about 2200° F. or below, and even though they solidify by isothermal solidification, they are vulnerable to liquation at temperatures above 2200° F. Prior art single-component brazing alloys solidify by cooling below the brazing temperature, and they are vulnerable to liquation at their own melting temperatures.

During evaluation of the present invention it was recognized that in a brazing alloy system for use with such advanced superalloys it is necessary to include strengthening and hardening elements of the articles being joined, and yet to provide for adequate flow characteristics to ensure proper filling of the joint region with brazing material, with minimum deleterious effects on the articles being joined. In addition, it is desirable to provide a brazing alloy composition which is compatible with that of the alloy articles being joined.

The present invention provides such capabilities through a series of braze materials, each comprising a mixture of at least two metallic powders. The various powders are selected such that at least one powder is substantially solid at the effective brazing temperature and at least one other powder is substantially liquid at that temperature.

It is convenient to visualize the various metallic powders employed in the present invention in three distinct groups. This first group is identified as the high-melting alloys. . They remain substantially solid at the effective brazing temperature. They may be nickel-base or cobalt-base alloys. In general, the high-melting alloys include some significant amount of many of the same alloying elements which are used in advanced superalloys, including solid solution strengtheners such as cobalt, molybdenum, tungsten and rhenium, gamma-prime formers such as aluminum, titanium and tantalum, and other elements such as chromium, hafnium and yttrium which confer environmental resistance on the alloy. There are some advanced superalloys which can be used, with essentially no modifications in composition, as high-melting alloys. The widely used superalloys Rene'80 and Rene'125 are examples of such alloys. One or more of the high-melting alloys comprise the high-melt component of the braze materials of the present invention.

Each alloy in a second group is substantially liquid at the effective brazing temperature. This second group is identified as the low-melting alloys. These alloys are nickel-base alloys which contain effective amounts of melting point depressants such as silicon, boron, or a combination of silicon and boron. However, melting point depressants are typically used at a lower level than is found in many of the prior art brazing alloys. Significant amounts of the solid solution strengtheners, the gamma-prime formers and the other alloying elements found in advanced superalloys are also included in the low-melting alloys. Some of the low-melting alloys are superalloys which have been modified by adding melting point depressants. For example, about 1 percent boron may be added to Rene'125. One or more of the low-melting alloys comprise the low-melt component of the braze materials of the present invention.

A third groups of alloy powders is comprised of nickel-base eutectic alloys; these are identified as eutectic alloys. They are formulated to have compositions that are near to naturally occurring eutectic compositions, where the eutectic transformation temperature lies below the melting ranges of the high-melting alloys. These alloys are substantially liquid at the effective brazing temperature. These alloys function to improve the flow characteristics of the alloy mixture at effective brazing temperatures, and to provide additions of certain specific alloying elements to the bulk composition. One or more of these eutectic alloys comprise the eutectic component of the braze materials of the present invention.

Nominal compositions of several representative alloys from each group are included in Table I.

Braze materials of the present invention include at least one alloy powder selected from the first group and at least one alloy powder selected from the second and third groups. The specific alloy powders selected, and the amount of each, must be carefully balanced to achieve acceptable flow characteristics during brazing and to maximize the strength and environmental resistance of the completed joint. Some of the factors considered in formulating and testing the braze materials were: metallurgical structure in the braze joint, including grain size; maximization of creep and rupture resistance of a brazed joint; maximization of thermal shock and low-cycle fatigue resistance of the joint; the relationship between brazing temperature of the mixture and suitable processing temperatures for the articles being joined; control of possible deleterious effects of segregation of alloying elements, including grain boundary effects; and maximization of environmental resistance of the brazing alloy. Several braze materials within the scope of the present invention are described in Table II. The braze materials are described by their constituent alloy powders and the relative amounts of each constituent, for that is how the mixtures are formulated in practice. The mixtures are also described by their respective bulk compositions, for such compositions represent the material within a completed brazed joint and, as such, indicate the expected performance of a brazed joint. The compositions and formulations presented in Tables I and II are set forth as examples of the present invention, and not as limitations thereon. Those skilled in the art will recognize that there is considerable flexibility in adjusting the compositions of the various constituent alloy powders, and the relative amounts of each, to favor one or another of the various factors that are important in the selection of brazing alloys for joining advanced superalloy articles. For example, if a particular application required improved flow characteristics, which might be achieved by increasing the amount of boron in the bulk composition, which could in turn be achieved by increasing the relative amount of a low-melting alloy, or by increasing the amount of boron in the low-melting alloy, or a combination of both. Alloy 56 in Table II is a representative prior art brazing alloy mixture, included for comparison purposes.

Those skilled in the art will also recognize that the high-melt component of the braze material may be partially melted at the effective brazing temperature, and the low-melt or eutectic component may be partially solid. This situation is particularly likely if the compositions of constituent alloy powders are adjusted for reasons such as those cited above. Such behavior should be regarded as normal and within intended the scope of the present invention.

Figure 2:
FIG. 2 is a photomicrograph of a brazed joint and adjacent substrate, where the joint was made with Alloy 9 under the conditions described in Example 4. Magnification 100×.

During the evaluation of the present invention it was found that the characteristics of the completed brazed joint depend on the chemical compositions of the constituent alloys and the relative amounts of each, as might be expected, but also on the manufacturing process employed in making the brazed joint. In Examples 1 and 2, below, the same brazing alloy mixture, Alloy 9, was used to plug chaplet holes in two different substrate materials. The characteristics of the substrate materials necessitated two different effective brazing temperatures. In Example 1 the effective brazing temperature was 2360° F.; in Example 2 the temperature was 2325° F. As shown in FIGS. 1 and 2, significantly different microstructures resulted from the two processes. The dendritic microstructure shown in FIG. 1 is approximately equal in rupture life to the granular microstructure shown in FIG. 2, but the dendritic structure survives more than twice as many thermal shock cycles as the granular structure before the onset of thermal fatigue cracks. On the basis of its superior thermal fatigue resistance, the dendritic structure was judged to be preferable. One skilled in the art will recognize that it would be possible to reformulate the alloy to obtain a dendritic microstructure under the brazing conditions of Example 2.

Among the formulations evaluated in the present invention, Alloy 48 had the longest rupture life. For applications where rupture life would be the most significant consideration, Alloy 48 would be the preferred embodiment of the invention. However, for the majority of applications in an aircraft gas turbine engines rupture life is one of many significant considerations. Resistance of environmental degradation and thermal fatigue, and ease of use are examples of such considerations. Where the nature of the application requires attention to multiple considerations, it is believed that among the alloy mixtures contemplated in the present invention, Alloy 9 represents the best mode of the invention, in that it offers the best all-around combination of characteristics.

In the course of evaluating the present invention, it was found that when the alloy mixtures of the present invention are used to join superalloy articles, the effective brazing temperature is most advantageously maintained above the gamma-prime solvus temperature. Further, the preferred brazing temperature is at or slightly below the temperature typically employed to homogenize the cast article. The specific temperature selected for any particular brazing application will necessarily be determined by the choice of alloy mixture and the substrate materials being joined. However, the range of effective brazing temperatures applicable to the present invention is likely to be above about 2300° F., rather than below 2200° F., as has been the usual practice in the prior art. For Alloy 9 the best mode effective brazing temperature was found to be about 2360° F., as illustrated in Examples 1 and 3, provided that the substrate material can be heated to that temperature without damage. Throughout this discussion, the term effective brazing temperature is intended to comprehend the range of temperatures which would be encountered in an actual brazing operation, and not just a nominal temperature.

The foregoing discussion and the Examples given below are provided to illustrate, rather than to limit, the present invention. Those skilled in the art will recognize that compositions and proportions of the brazing alloys of the type described herein can be adjusted over significant ranges within the intended scope of the present invention, and that the temperature selected for brazing necessarily reflects the characteristics of both the brazing alloy and the superalloy article being joined.

EXAMPLES

Example 1

Chaplet holes in a hollow cast single grain turbine blade were filled using Alloy 9 (Table II). The holes were approximately 0.015 inch diameter; the wall thickness of the casting was approximately 0.020 inch. The composition of the casting was similar to that of Alloy HM1 (Table I). Alloy 9 powder was mixed with approximately 10 to 15 percent by weight of a commercially available binder known as AB215 (manufactured by Aerobraze Corporation, Cincinnati, Ohio) to form a slurry. The slurry was applied to a previously homogenized turbine blade casting to cover the chaplet holes. Brazing was accomplished by heating in vacuum at 2360° F. for approximately 20 minutes. The blade was then rapidly cooled to below 1200° F. It was then reheated to 2125° F. for 4 hours and 2150° F. for 4 hours. The blade was subsequently heat treated according to the procedure for the single grain blade alloy. The chaplet holes were completely filled. The microstructure, shown in FIG. 1, was dendritic in character.

Example 2

Chaplet holes in a hollow cast single grain turbine blade were filled using Alloy 9 (Table II). The holes were approximately 0.015 inch diameter; the wall thickness of the casting was approximately 0.020 inch. The composition of the casting was similar to that of Alloy HM2 (Table I). Alloy 9 powder was mixed with approximately 10 to 15 percent by weight of a commercially available binder known as AB215 (manufactured by Aerobraze Corporation, Cincinnati, Ohio) to form a slurry. The slurry was applied to a previously homogenized turbine blade casting to cover the chaplet holes. Brazing was accomplished by heating in vacuum at 2325° F. for approximately 20 minutes. The blade was then rapidly cooled to below 1200° F. It was then reheated to 2125° F. for 4 hours and 2150° F. for 4 hours. The blade was subsequently heat treated according to the procedure for the single grain blade alloy. The chaplet holes were completely filled. The microstructure, shown in FIG. 2, was granular in character.

Example 3

A core print slot in a hollow cast single grain turbine blade was filled using Alloy 9 (Table II). The slot was approximately 0.050 inch wide by 0.5 inch long; the wall thickness of the casting was approximately 0.040 inch. The composition of the casting was similar to that of Alloy HM1 (Table I). Alloy 9 powder was mixed with approximately 8 percent by weight of a commercially available binder known as Nicrobraz 500 and 2 percent by weight of another binder known as Nicrobraz 1000 (both manufactured by Wall Colmonoy Corporation, Detroit, Mich.) and pressed to form a flat sheet approximately 0.05 inch thick. A preform, which overlapped the slot by approximately 0.03 inch per side, was cut from the sheet and laid over the slot in a previously homogenized turbine blade casting. Brazing was accomplished by heating in vacuum at 2360° F. for approximately 20 minutes. The blade was then rapidly cooled to below 1200° F. It was then reheated to 2125° F for 4 hours and 2150° F. for 4 hours. The blade was subsequently heat treated according to the procedure for the single grain blade alloy. The slot was completely filled.

Example 4

A core print slot in a hollow cast single grain was filled using Alloy 9 (Table II). The slot was approximately 0.050 inch wide by 0.5 inch long; the wall thickness of the casting was approximately 0.040 inch. The composition of the casting was similar to that of Alloy HM2 (Table I). Alloy 9 powder was mixed with approximately 8 percent by weight of a commercially available binder known as Nicrobraz 500 and 2 percent by weight of another binder known as Nicrobraz 1000 (both manufactured by Wall Colmonoy Corporation, Detroit, Mich.) and pressed to form a flat sheet approximately 0.05 inch thick. A preform, which overlapped the slot by approximately 0.03 inch per side, was cut from the sheet and laid over the slot in a previously homogenized turbine blade casting. Brazing was accomplished by heating in vacuum at 2325° F. for approximately 20 minutes. The blade was then rapidly cooled to below 1200° F. It was then reheated to 2125° F. for 4 hours and 2150° F. for 4 hours. The blade was subsequently heat treated according to the procedure for the single grain blade alloy. The slot was completely filled.

Example 5

Figure 3:
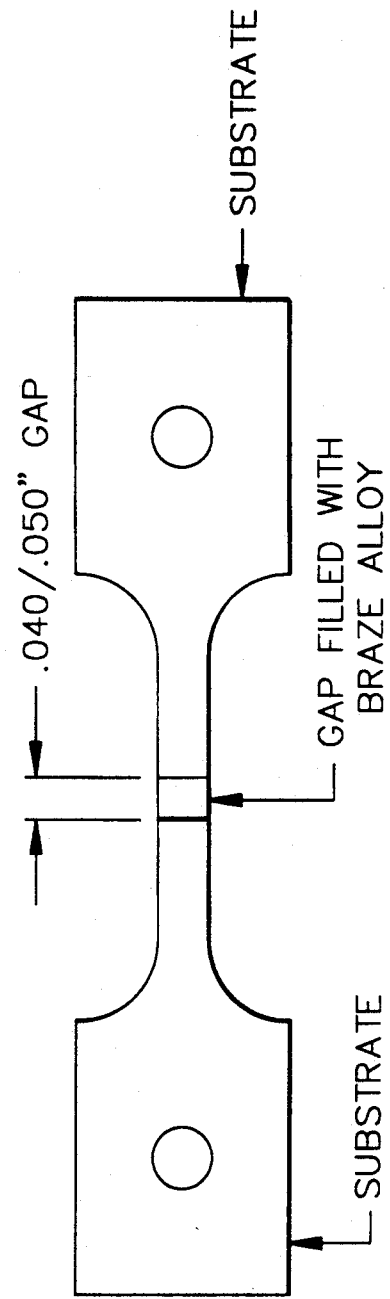
FIG. 3 is a schematic representation of the wide-braze-gap specimens used in evaluating the stress rupture capability of the alloys of the present invention.

To evaluate the stress rupture capabilities of several alloy mixtures shown in Table II, test specimens of the configuration shown in FIG. 3 were made from a single grain article having a composition similar to alloy HM1. Joints incorporating the various brazing alloys were made, using procedures similar to those of Example 3. The specimens were deliberately made with a wide braze gap, specifically to evaluate the stress rupture capability of the brazing alloys, not the base metal being joined. The specimens were tested at 2000° F. at a stress of 4,000 pounds per square inch. The test results are summarized in Table III. The average values in Table III are logarithmic averages. Note that all of the alloy mixtures of the present invention provide rupture life values more than about 15 times that of alloy 56, a prior art alloy.

TABLE I

NOMINAL COMPOSITIONS OF BRAZING ALLOY CONSTITUENTS

| | Co | Cr | Al | Ti | Mo | Ta | W | Nb | Re | Hf | Si | B | Other |
|---|---|---|---|---|---|---|---|---|---|---|---|---|---|
| GROUP 1 - HIGH-MELT ALLOYS | | | | | | | | | | | | | |
| HM1 | 7.5 | 7.0 | 6.2 | | 1.5 | 6.5 | 5.0 | | 3.0 | .15 | | | |
| HM2 | 7.5 | 9.8 | 4.2 | 3.5 | 1.5 | 4.8 | 6.0 | .5 | | .15 | | | |
| HM3 | 12.0 | 6.9 | 6.2 | | 1.5 | 6.4 | 4.9 | | 2.8 | 1.50 | | | |
| HM4 | 10.0 | 8.9 | 4.8 | 2.5 | 2.0 | 3.8 | 7.0 | | | 1.55 | | | |
| HM5 | 4.0 | 9.0 | 6.0 | | 1.5 | 5.0 | 4.5 | | 1.5 | .90 | | | 0.3 Y |
| HM6 | 4.0 | 9.0 | 6.0 | | 1.5 | 5.0 | 4.5 | | 1.5 | .90 | | | |
| HM7 | Bal | 34.7 | | | | 9.7 | 8.5 | | | | | | Co-Base |
| HM8 | 7.6 | 6.9 | | | 3.2 | 13.0 | 10.0 | | 6.0 | | | | |
| HM9 | 18.5 | 4.5 | | | | 13.7 | 11.0 | | 12.0 | | | | |
| HM10 | 9.5 | 14.0 | 3.0 | 5.0 | 4.0 | | 4.0 | | | | | | |
| GROUP 2 - LOW-MELT ALLOYS | | | | | | | | | | | | | |
| LM1 | 10.3 | 15.3 | 3.5 | | | 3.4 | | | | | | 2.30 | |
| LM2 | 4.0 | 15.0 | 2.5 | 11.5 | | | | 3.0 | | | .25 | .25 | |
| LM3 | 3.9 | 9.5 | 6.0 | | 1.5 | 5.4 | 4.6 | | 1.5 | 1.10 | 3.00 | | |
| LM4 | 25.1 | 22.0 | 3.9 | | | | | | | | 10.00 | | |
| LM5 | 7.8 | 6.8 | 12.2 | | | | | | | .45 | 2.50 | | |
| LM6 | 7.7 | 6.7 | 12.1 | | | | | | | .20 | 2.50 | .22 | |
| LM7 | 6.2 | 4.6 | | | | | | | | .54 | 2.00 | .28 | |
| LM8 | 10.0 | 9.0 | 5.1 | 2.7 | 2.0 | 3.7 | 7.0 | | | 1.10 | | 1.00 | |
| LM9 | 4.0 | 9.2 | 6.1 | | 1.5 | 4.9 | 4.5 | | 1.4 | .70 | | 1.00 | |
| LM10 | 7.5 | 9.6 | 5.8 | 1.6 | 1.5 | 5.0 | 6.1 | | | .40 | | 1.00 | |
| GROUP 3 - EUTECTIC ALLOYS | | | | | | | | | | | | | |
| E1 | 3.1 | 15.8 | 3.0 | 7.2 | 1.3 | 1.7 | 2.4 | 5.1 | 1.0 | .10 | | | 0.6 Y |
| E2 | 6.0 | 35.0 | 2.4 | 8.6 | | | | 3.0 | | | | | |
| E3 | 4.0 | 35.0 | 1.5 | 11.5 | | | | 3.0 | | | | | |
| E4 | | 38.5 | | | | 23.1 | | | | | | | |
| E5 | 8.2 | 6.8 | 12.6 | | | | | | | .40 | | | |

TABLE II

NOMINAL COMPOSITIONS OF BRAZING ALLOYS

| Alloy | High-Melt | Low-Melt | Eutectic | Co | Cr | Al | Ti | Mo | Ta | W | Nb | Re | Hf | Si | B | Other |
|---|---|---|---|---|---|---|---|---|---|---|---|---|---|---|---|---|
| 1 | 75% HM1 | | 25% E3 | 6.6 | 14.0 | 5.0 | 2.9 | 1.1 | 4.9 | 3.8 | .8 | 2.3 | .11 | | | |
| 2 | 80% HM1 | | 20% E3 | 6.8 | 12.6 | 5.3 | 2.3 | 1.2 | 5.2 | 4.0 | .6 | 2.4 | .12 | | | |
| 3 | 70% HM1 | 15% LM4 | 15% E3 | 9.6 | 13.5 | 5.2 | 1.7 | 1.1 | 4.6 | 3.5 | .5 | 2.1 | .11 | 1.50 | | |
| 4 | 70% HM1 | | 15% E1; 15% E3 | 6.3 | 12.5 | 5.0 | 2.8 | 1.2 | 4.8 | 3.9 | 1.2 | 2.3 | .12 | | | .1 Y |
| 5 | 65% HM1 | | 35% E2 | 7.1 | 14.0 | 5.3 | 2.2 | 1.1 | 4.9 | 3.8 | .8 | 2.3 | .11 | | | |
| 6 | 70% HM1 | 15% LM4 | 15% E2 | 9.9 | 13.5 | 5.3 | 1.3 | 1.1 | 4.6 | 3.5 | .5 | 2.1 | .11 | 1.50 | | |
| 7 | 70% HM2 | 10% LM1 | 20% E3 | 7.1 | 15.4 | 3.6 | 4.7 | 1.1 | 3.7 | 4.2 | 1.0 | | .11 | | .23 | |
| 8 | 65% HM2 | 10% LM1 | 25% E2 | 7.4 | 16.6 | 3.7 | 4.4 | 1.0 | 3.5 | 3.9 | 1.1 | | .10 | | .23 | |
| 9 | 65% HM3 | 10% LM1 | 25% E2 | 10.3 | 14.8 | 4.9 | 2.2 | 1.0 | 4.5 | 3.2 | .8 | 1.8 | .98 | | .23 | |
| 10 | 65% HM1 | 10% LM1 | 25% E2 | 7.4 | 14.8 | 5.0 | 2.2 | 1.0 | 4.6 | 3.3 | .8 | 2.0 | .10 | | .23 | |
| 11 | 70% HM3 | 10% LM1 | 20% E2 | 10.6 | 13.4 | 5.1 | 1.7 | 1.1 | 4.8 | 3.4 | .6 | 2.0 | 1.05 | | .23 | |
| 12 | 65% HM2 | 15% LM4 | 20% E2 | 9.8 | 16.6 | 3.8 | 4.0 | 1.0 | 3.1 | 3.9 | .9 | | .10 | 1.50 | | |
| 13 | 40% HM3 | 40% LM3; 20% LM2 | | 7.2 | 9.6 | 5.4 | 2.3 | 1.2 | 4.7 | 3.8 | .6 | 1.7 | 1.04 | 1.25 | .05 | |
| 14 | 70% HM1 | 15% LM2; 15% LM4 | | 9.6 | 10.5 | 5.3 | 1.7 | 1.1 | 4.6 | 3.5 | .5 | 2.1 | .11 | 1.54 | .04 | |
| 15 | 65% HM2 | 20% LM2; 15% LM4 | | 9.4 | 12.6 | 3.8 | 4.5 | 1.0 | 3.1 | 3.9 | .9 | | .10 | 1.55 | .05 | |
| 16 | 40% HM3 | 40% LM3 | 20% E2 | 7.6 | 13.6 | 5.3 | 1.7 | 1.2 | 4.7 | 3.8 | .6 | 1.7 | 1.04 | 1.20 | | |
| 17 | 70% HM3 | | 30% E2 | 10.2 | 15.3 | 5.0 | 2.6 | 1.1 | 4.5 | 3.4 | .9 | 2.0 | 1.05 | | | |
| 18 | 70% HM3 | 5% LM1 | 25% E2 | 10.4 | 14.3 | 5.1 | 2.2 | 1.1 | 4.7 | 3.4 | .8 | 2.0 | 1.05 | | .12 | |
| 19 | 64% HM3 | 10% LM1 | 25% E2 | 10.3 | 14.7 | 4.9 | 2.2 | 1.0 | 4.4 | 4.0 | .8 | 1.8 | .96 | | .23 | 1 WC |
| 20 | 70% HM3 | | 30% E1 | 9.3 | 9.6 | 5.2 | 2.2 | 1.4 | 5.0 | 4.2 | 1.5 | 2.3 | 1.08 | | | .2 Y |
| 21 | 50% HM3 | 40% LM3 | 10% E1 | 7.9 | 8.8 | 5.8 | .7 | 1.5 | 5.5 | 4.5 | .5 | 2.1 | 1.20 | 1.20 | | .05 Y |
| 22 | 60% HM3 | 40% LM3 | | 8.8 | 7.9 | 6.1 | | 1.5 | 6.0 | 4.8 | | 2.3 | 1.34 | 1.20 | | |
| 23 | 55% HM3 | 40% LM3; 5% LM1 | | 8.7 | 8.4 | 6.0 | | 1.4 | 5.9 | 4.5 | | 2.1 | 1.27 | 1.20 | .12 | |
| 24 | 55% HM3 | 35% LM3; 10% LM1 | | 9.0 | 8.7 | 5.8 | | 1.4 | 5.8 | 4.3 | | 2.1 | 1.21 | 1.05 | .23 | |
| 25 | 60% HM3 | 35% LM3; 5% LM1 | | 9.1 | 8.2 | 6.0 | | 1.4 | 2.9 | 4.6 | | 2.2 | 1.29 | 1.05 | .15 | |
| 26 | 50% HM8 | | 50% E5 | 7.9 | 6.9 | 6.3 | | 1.6 | 6.5 | 5.0 | | 3.0 | .20 | | | |
| 27 | 50% HM8 | 50% LM5 | | 7.7 | 6.9 | 6.1 | | 1.6 | 6.5 | 5.0 | | 3.0 | .23 | 1.25 | | |
| 28 | 50% HM8 | 50% LM6 | | 7.7 | 6.8 | 6.1 | | 1.6 | 6.5 | 5.0 | | 3.0 | .10 | 1.25 | .11 | |
| 29 | 40% HM8 | 60% LM6 | | 7.7 | 6.8 | 7.3 | | 1.3 | 5.2 | 4.0 | | 2.4 | .12 | 1.50 | .13 | |
| 30 | 50% HM3 | 40% LM3 | 10% E4 | 7.6 | 11.1 | 5.5 | | 1.4 | 7.7 | 4.3 | | 2.0 | 1.19 | 1.20 | | |
| 31 | 40% HM3; 10% HM8 | 50% LM3 | | 7.5 | 8.2 | 5.5 | | 1.7 | 6.6 | 5.3 | | 2.5 | 1.15 | 1.50 | | |
| 32 | 40% HM3; 10% HM8 | 40% LM3; 10% LM6 | | 7.9 | 7.9 | 6.1 | | 1.5 | 6.0 | 4.8 | | 2.3 | 1.06 | 1.45 | | |
| 33 | 50% HM3 | 50% LM3 | | 8.0 | 8.2 | 6.1 | | 1.5 | 5.9 | 4.8 | | 2.2 | 1.30 | 1.50 | | |
| 34 | 50% HM9 | 50% LM6 | | 13.1 | 5.6 | 6.1 | | | 6.9 | 5.5 | | 6.0 | .10 | 1.25 | .11 | |

TABLE II-continued

NOMINAL COMPOSITIONS OF BRAZING ALLOYS

| Alloy | Constituents High-Melt | Low-Melt | Eutectic | Co | Cr | Al | Ti | Mo | Ta | W | Nb | Re | Hf | Si | B | Other |
|---|---|---|---|---|---|---|---|---|---|---|---|---|---|---|---|---|
| 35 | 40% HM9 | 60% LM6 | | 12.0 | 2.8 | 7.3 | | | 5.5 | 4.4 | | 4.8 | .12 | 1.50 | .13 | |
| 36 | 30% HM8; 20% HM3 | 35% LM6; 15% LM7 | | 8.3 | 6.5 | 5.5 | | 1.3 | 5.2 | 4.0 | | 2.4 | .45 | 1.18 | .12 | |
| 37 | 25% HM9; 20% HM3 | 40% LM6; 15% LM7 | | 11.0 | 5.9 | 6.1 | | .3 | 4.7 | 3.7 | | 3.6 | .46 | 1.30 | .13 | |
| 38 | 35% HM8; 15% HM3 | 40% LM6; 10% LM7 | | 8.2 | 6.6 | 5.8 | | 1.3 | 5.5 | 4.2 | | 2.5 | .36 | 1.20 | .12 | |
| 39 | (25% HM8; 10% HM10; (15% HM7 | 30% LM6; 20% LM7 | | 13.5 | 11.3 | 3.9 | .5 | 1.2 | 4.7 | 4.2 | | 1.5 | .17 | 1.15 | .12 | |
| 40 | (25% HM8; 10% HM4; (15% HM7 | 30% LM6; 20% LM7 | | 13.5 | 10.8 | 4.1 | .3 | 1.0 | 5.1 | 4.5 | | 1.5 | .32 | 1.15 | .12 | |
| 41 | 40% HM6 | 60% LM3 | | 3.9 | 9.3 | 6.0 | | 1.5 | 5.2 | 4.6 | | 1.5 | 1.02 | 1.80 | | |
| 42 | 40% HM3 | 60% LM3 | | 7.1 | 8.5 | 6.1 | | 1.5 | 5.8 | 4.7 | | 2.0 | 1.26 | 1.80 | | |
| 43 | 40% HM4 | 60% LM3 | | 6.3 | 9.3 | 5.5 | 1.0 | 1.7 | 4.8 | 5.6 | | .9 | 1.28 | 1.80 | | |
| 44 | 40% HM6 | 60% LM9 | | 4.0 | 9.1 | 5.6 | | 1.7 | 4.5 | 5.5 | | .8 | 1.04 | | .60 | |
| 45 | 40% HM3 | 60% LM9 | | 7.2 | 8.3 | 6.1 | | 1.5 | 5.5 | 4.7 | | 2.0 | 1.02 | | .60 | |
| 46 | 40% HM4 | 60% LM9 | | 6.4 | 9.1 | 5.6 | 1.0 | 1.7 | 4.5 | 5.5 | | .8 | 1.04 | | .60 | |
| 47 | 50% HM4 | 50% LM8 | | 10.0 | 9.0 | 5.0 | 2.6 | 2.0 | 3.8 | 7.0 | | | 1.33 | | .50 | |
| 48 | 40% HM4 | 60% LM8 | | 10.0 | 9.0 | 5.0 | 2.6 | 2.0 | 3.7 | 7.0 | | | 1.28 | | .60 | |
| 49 | 30% HM4 | 70% LM8 | | 10.0 | 9.0 | 5.0 | 2.6 | 2.0 | 3.7 | 7.0 | | | 1.24 | | .70 | |
| 50 | 40% HM4 | 60% LM10 | | 8.5 | 9.3 | 5.4 | 2.0 | 1.7 | 4.5 | 6.5 | | | .86 | | .60 | |
| 51 | 40% HM6 | 45% LM9; 15% LM3 | | 4.0 | 9.2 | 6.0 | | 1.5 | 5.0 | 4.5 | | 1.5 | .84 | .45 | .45 | |
| 52 | 20% HM3; 20% HM6 | 45% LM8; 15% LM3 | | 8.3 | 8.7 | 5.6 | 1.2 | 1.7 | 4.8 | 5.7 | | 1.1 | 1.14 | .45 | .45 | |
| 53 | 35% HM6 | 65% LM3 | | 3.9 | 9.3 | 6.0 | | 1.5 | 5.3 | 4.6 | | 1.5 | 1.03 | 1.95 | | |
| 54 | 35% HM5 | 65% LM3 | | 3.9 | 9.3 | 6.0 | | 1.5 | 5.3 | 1.6 | | 1.5 | 1.03 | 1.95 | | .1 Y |
| 55 | 40% HM5 | 45% LM9; 15% LM3 | | 4.0 | 9.2 | 6.0 | | 1.5 | 5.0 | 4.5 | | 1.5 | .84 | .45 | .45 | .1 Y |
| 56 | 50% HM10 | 50% LM1 | | 9.9 | 14.7 | 3.2 | 2.5 | 2.0 | 1.7 | 2.0 | | | | | 1.15 | |

(Prior art alloy included for comparison)

NOTE: All alloys are nickel-base alloys for which the remainder of each alloy is nickel

TABLE III

STRESS RUPTURE TEST RESULTS
(All tests at 2000 F., 4 ksi)

| Specimen Ident | Alloy | Hours to Failure | Log Average Hours to Failure |
|---|---|---|---|
| A-4 | 48 | 363.1 | |
| A-5 | 48 | 446.7 | |
| A-6 | 48 | 345.5 | 382.7 |
| A-7 | 50 | 74.1 | |
| A-8 | 50 | 94.4 | |
| A-9 | 50 | 225.7 | 116.4 |
| A-19 | 90 | 86.1 | |
| A-20 | 90 | 117.8 | |
| A-21 | 90 | 13.2 | 51.2 |
| A-24 | 19 | 99.5 | |
| A-25 | 19 | 36.9 | |
| A-26 | 19 | 50.7 | 57.1 |
| A-32 | 35 | 85.5 | |
| A-33 | 54 | 90.7 | |
| A-38 | 55 | 133.8 | |
| 1 | 9G | 49.9 | |
| 2 | 9G | 82.7 | 64.2 |
| A-39 | 56 | 5.6 | |
| A-40 | 56 | 4.4 | |
| A-41 | 56 | 1.7 | 3.5 |

(Prior art braze alloy)

Note: The alloy designated 9D was processed under conditions of Example 1; the alloy designated 9G was processed under conditions of Example 2.

We claim:

1. An improved braze material for brazing at least one superalloy substrate comprising:

a high melt component having at least one metallic powder consisting essentially of, by weight, about 4 to about 18.5 percent cobalt, about 4.5 to about 14 percent chromium, about 3 to about 6.2 percent aluminum, 0 to about 5 percent titanium, 0 to about to 4 percent molybdenum, about 3.8 to about 13.7 percent tantalum, about 4 to about 11 percent tungsten, 0 to about 0.5 percent niobium, 0 to about 12 percent rhenium, 0 to about 1.55 percent hafnium, 0 to about 0.3 percent yttrium, boron and silicon only as incidental inpurities, with the balance being nickel and other incidental impurities; and a low melt component having at least one metallic powder consisting essentially of, by weight, about 3.9 to about 25 percent cobalt, about 4.6 to about 22 percent chromium, 0 to about 12.2 percent aluminum, 0 to about 11.5 percent titanium, 0 to about 2 percent molybdenum, 0 to about 5.4 percent tantalum, 0 to about 7 percent tungsten, 0 to about 3 percent niobium, 0 to about 1.5 percent rhenium, 0 to about 1.1 percent hafnium, 0 to about 10 percent silicon, 0 to about 2.3 percent boron, wherein the total amount of silicon plus boron is at least 0.5 percent, with the balance being nickel and incidental impurities;

wherein the high melt component and the low melt component together comprise a bulk composition range consisting essentially of, by weight, about 3 to about 13.5 percent cobalt, about 2.8 to about 15 percent chromium, about 3 to about 7.5 percent aluminum, 0 to about 5 percent titanium, 0 to about 2.5 percent molybdenum, about 2.5 to about 6.9 percent tantalum, about 3 to about 8 percent tungsten, 0 to about 1.5 percent niobium, 0 to about 6 percent rhenium, 0 to about 1.5 percent hafnium, 0 to about 2.2 percent silicon, 0 to about 1 percent boron, with the balance being nickel and incidental impurities;

wherein the bulk composition range comprises less than about 2.2 total weight percent of elements selected from the group consisting of boron and silicon;

wherein the low melt component comprises about 30 to about 70 percent by weight of the braze material;

wherein the braze material has an effective brazing temperature above about 2300° F.;

wherein the high melt component is substantially solid at the effective brazing temperature; and wherein the low melt component is substantially liquid at the effective brazing temperature.

2. The braze material of claim 1 in which the bulk composition range comprises, by weight, about 8 to about 12 percent cobalt, about 8 to about 10 percent chromium, abut 4.5 to about 5.5 percent aluminum, about 2 to about 3 percent titanium, 1.5 to about 2.5 percent molybdenum, about 3 to about 4.2 percent tantalum, about 6 to about 8 percent tungsten, 0 to about 1 percent niobium, 0 to about 1 percent rhenium, about 1 to about 1.5 percent hafnium, 0 to about 1 percent boron, with the balance being nickel and incidental impurities.

3. The braze material of claim 1, in which the high melt component is comprised of at least two metallic powders, each having a composition range that contains boron and silicon only as incidental impurities.

4. The braze material of claim 1 in which the low melt component is comprised of at least two metallic powders, each having a composition range that includes at least one element selected from the group consisting of boron and silicon.

5. The braze material of claim 1, wherein the bulk composition comprises, by weight, about 10 to about 13.5 percent cobalt, about 6 to about 9 percent chromium, about 5 to about 7 percent aluminum, 1 to about 2 percent molybdenum, about 5.5 to about 6.9 percent tantalum, about 4 to about 6 percent tungsten, about 2 to about 3.5 percent rhenium, about 1 to about 1.5 percent hafnium, about 0.1 to about 0.5 percent boron, with the balance being nickel and incidental impurities.

6. The braze material of claim 1, wherein the high melt component additionally includes a metallic powder consisting essentially of, by weight, about 33 to about 37 percent chromium, about 9 to about 11 percent tantalum, about 7.5 to about 9.5 percent tungsten, with the balance cobalt and incidental impurities.

7. An improved braze material for brazing at least one superalloy substrate comprising:

a high melt component having at least one metallic powder having a composition range consisting essentially of, by weight, about 4 to about 12 percent cobalt, about 4.5 to about 14 percent chromium, about 3 to about 6.2 percent aluminum, 0 to about 5 percent titanium, 0 to about 4 percent molybdenum, about 3.8 to about 13 percent tantalum, about 4 to about 11 percent tungsten, 0 to about 0.5 percent niobium, 0 to about 12 percent rhenium, 0 to about 1.55 percent hafnium, 0 to about 0.3 percent yttrium, boron and silicon only as incidental inpurities, with the balance being nickel and other incidental impurities; and a eutectic component having at least one metallic powder having a composition range consisting essentially of, by weight, about 3.1 to about 8.2 percent cobalt, about 6.8 to about 38.5 percent chromium, 0 to about 12.6 percent aluminum, 0 to about 11.5 percent titanium, 0 to about 1.3 percent molybdenum, 0 to about 23.1 percent tantalum, 0 to about 2.4 percent tungsten, 0 to about 5.1 percent niobium, 0 to about 1 percent rhenium, 0 to about 0.4 percent hafnium, 0 to about 0.6 percent yttrium, less than about 0.15 percent carbon, with the balance being nickel and incidental impurities;

wherein the high melt component and the eutectic component together comprise a bulk composition range consisting essentially of, by weight, about 6 to about 10.2 percent cobalt, about 6 to about 16 percent chromium, about 4.5 to about 6.6 percent aluminum, 0 to about 3.5 percent titanium, 0 to about 2 percent molybdenum, about 4 to about 7.5 percent tantalum, about 3 to about 6 percent tungsten, 0 to about 2 percent niobium, 0 to about 4 percent rhenium, 0 to about 1.08 percent hafnium, 0 to about 0.2 percent yttrium, with the balance being nickel and incidental impurities;

wherein the eutectic component comprises about 20 to about 50 percent by weight of the braze material;

wherein the braze material has an effective brazing temperature above about 2300° F.;

wherein the high melt component is substantially solid at the effective brazing temperature; and wherein the eutectic component is substantially liquid at the effective brazing temperature.

8. The braze material of claim 7 in which the bulk composition range comprises, by weight, about 6 to about 10 percent cobalt, about 12 to about 16 percent chromium, about 4.5 to about 6 percent aluminum, 1.5 to about 3.5 percent titanium, 0 to about 2 percent molybdenum, about 4 to about 6 percent tantalum, about 3 to about 5 percent tungsten, 0 to about 2 percent niobium, 0 to about 3 percent rhenium, 0 to about 0.3 percent hafnium, with the balance being nickel and incidental impurities.

9. The braze material of claim 7 in which the bulk composition range comprises, by weight, about 6 to about 10 percent cobalt, about 6 to about 8 percent chromium, about 5.5 to about 6.6 percent aluminum, 0 to about 2 percent molybdenum, about 5.5 to about 7.5 percent tantalum, about 4 to about 6 percent tungsten, 0 to about 1 percent niobium, about 2 to about 4 percent rhenium, 0 to about 0.3 percent hafnium, with the balance being nickel and incidental impurities.

10. The braze material of claim 7 in which the high melt component is comprised of at least two metallic powders based on the group of elements consisting of cobalt and nickel, each having a composition range that contains boron and silicon only as incidental impurities.

11. The braze material of claim 7 in which the eutectic component is comprised of at least two nickel-base alloys, each having a composition range.

12. The braze material of claim 7 in which the eutectic component is comprised of at least two nickel-base alloys, each having a composition range.

13. An improved braze material for brazing at last one superalloy substrate comprising:

a high melt component having at least one metallic powder consisting essentially of, by weight, about 4 to about 18.5 percent cobalt, about 4.5 to about 14 percent chromium, about 3 to about 6.2 percent aluminum, 0 to about 5 percent titanium, 0 to about to 4 percent molybdenum, about 3.8 to about 13.7 percent tantalum, about 4 to about 11 percent tungsten, 0 to about 0.5 percent niobium, 0 to about 12 percent rhenium, 0 to about 1.55 percent hafnium, 0 to about 0.3 percent yttrium, boron and silicon only as incidental inpurities, with the balance being nickel and other incidental impurities;

a low melt component having at least one metallic powder consisting essentially of, by weight, about 3.9 to about 25 percent cobalt, about 4.6 to about 22 percent chromium, 0 to about 12.2 percent aluminum, 0 to about 11.5 percent titanium, 0 to about 2 percent molybdenum, 0 to about 5.4 percent tantalum, 0 to about 7 percent tungsten, 0 to about 3 percent niobium, 0 to about 1.5 percent rhenium, 0 to about 1.1 percent hafnium, 0 to about 10 percent silicon, 0 to about 2.3 percent boron, wherein the total amount of silicon plus boron is at least 0.5 percent, with the balance being nickel and incidental impurities; and a eutectic component having at least one metallic powder having a composition range consisting essentially of, by weight, about 3.1 to about 8.2 percent cobalt, about 6.8 to about 38.5 percent chromium, 0 to about 12.6 percent aluminum, 0 to about 11.5 percent titanium, 0 to about 1.3 percent molybdenum, 0 to about 23.1 percent tantalum, 0 to about 2.4 percent tungsten, 0 to about 5.1 percent niobium, 0 to about 1 percent rhenium, 0 to about 0.4 percent hafnium, 0 to about 0.6 percent yttrium, less than about 0.15 percent carbon, with the balance being nickel and incidental impurities;

wherein the high melt component and the low melt component and the eutectic component together comprise a bulk composition range consisting essentially of, by weight, about 6 to about 12 percent cobalt, about 7 to about 18 percent chromium, about 3 to about 6.5 percent aluminum, 0 to about 5.5 percent titanium, 0 to about 2 percent molybdenum, about 3 to about 8.5 percent tantalum, about 2.5 to about 5.5 percent tungsten, 0 to about 1.2 percent niobium, 0 to about 3.5 percent rhenium, 0 to about 1.5 percent hafnium, 0 to about 1.8 percent silicon, 0 to about 1 percent boron, 0 to about 0.1 percent carbon, with the balance being nickel and incidental impurities;

wherein the bulk composition range comprises less than about 2.0 total weight percent of elements selected from the group consisting of boron and silicon;

wherein the low melt component comprises about 10 to about 40 percent by weight of the braze material and the eutectic component comprises about 10 to about 30 percent by weight of the braze material;

wherein the braze material has an effective brazing temperature above about 2300° F.;

wherein the high melt component is substantially solid at the effective brazing temperature; and wherein the low melt and eutectic components are substantially liquid at the effective brazing temperature.

14. The braze material of claim 13 in which the bulk composition range comprises, by weight, about 9 to about 12 percent cobalt, about 13 to about 16 percent chromium, abut 4.5 to about 5.5 percent aluminum, about 1.5 to about 3 percent titanium, 0.5 to about 1.5 percent molybdenum, about 3.5 to about 5.5 percent tantalum, about 2.5 to about 4 percent tungsten, 0 to about 1.2 percent niobium, 1 to about 2.5 percent rhenium, about 0.5 to about 1.5 percent hafnium, 0 to about 0.7 percent boron, with the balance being nickel and incidental impurities.

15. The braze material of claim 13 in which the high melt component is comprised of at least two metallic powders based on the group of elements consisting of cobalt and nickel, each having a composition range that contains boron and silicon only as incidental impurities.

16. The braze material of claim 13 in which the low melt component is comprised of at least two nickel-base alloys, each having a composition range that includes a amount of at least one element selected from the group consisting of boron and silicon.

* * * * *